Oct. 27, 1925.

C. E. E. WOLFERMANN 1,558,527

GLARESHIELD FOR AUTOMOBILES

Filed Oct. 4, 1924   2 Sheets-Sheet 1

Carl E. E. Wolfermann
INVENTOR.

BY Otto K. Zwingenberger
ATTORNEYS.

Oct. 27, 1925.
C. E. E. WOLFERMANN
1,558,527
GLARESHIELD FOR AUTOMOBILES
Filed Oct. 4, 1924
2 Sheets-Sheet 2
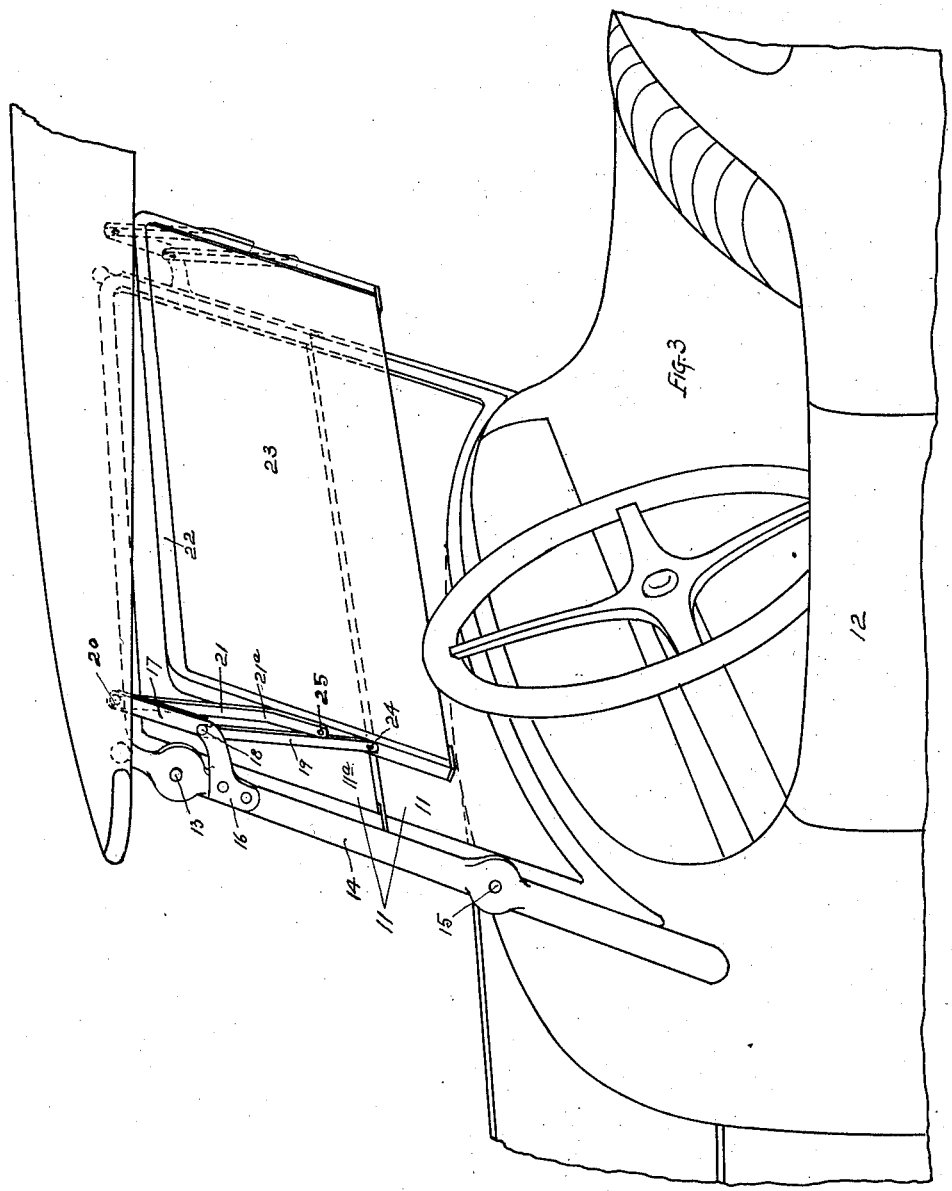
Carl E. E. Wolfermann
INVENTOR.
BY Otto K. Zwingenberger
ATTORNEYS.

Patented Oct. 27, 1925.

1,558,527

UNITED STATES PATENT OFFICE.

CARL E. E. WOLFERMANN, OF NEW YORK, N. Y.

GLARESHIELD FOR AUTOMOBILES.

Application filed October 4, 1924. Serial No. 741,757.

*To all whom it may concern:*

Be it known that I, CARL E. E. WOLFERMANN, a citizen of the United States of America, and a resident of New York, county and State of New York, have invented certain new and useful Improvements in Glareshields for Automobiles, of which the following is a specification.

This invention relates to an automobile window and it particularly relates to a window adapted to absorb the glare of search lights.

The object of the invention is to provide means which will absorb the glare of sun light or of a search light of another automobile coming at night time from the opposite direction.

It is also an object of the invention to provide means which are only temporarily mounted in working position and which with one push of the hand can be put out of the way to be returned into such working position with only one pull by the hand.

It is another object of the invention to furnish such a window for the absorption of the glare of search lights of such an arrangement that it can be mounted to an automobile of any type and style.

The means up to now applied for the relief of the driver of an automobile of the annoying glare of the search lights of an automobile coming at night from the opposite direction are usually small colored plates mounted in front of the wind shield, or the upper window of the wind shield is made of colored glass to absorb the glare of search lights, but they cause irritation to the driver of the automobile at day time because they compel him to see the surroundings in an unnatural light, which, though interesting in the beginning for its novelty, soon becomes unbearable.

My new glare window can be easily installed in any automobile, whether it be an open or closed car, and it can be mounted in, or removed from, its working position by one touch with the hand.

For the better understanding of my invention I refer to the accompanying drawings in which—

Fig. 3 is a perspective view from the rear of the driver's seat, showing the arrangement of my new glare window in connection with the wind shield of an open car.

Like numerals denote like parts throughout all the various figures.

Figure 1:
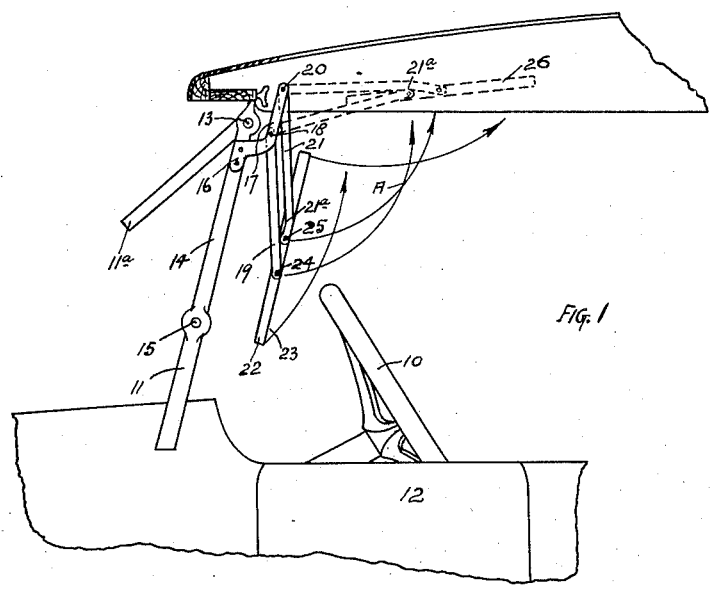
Fig. 1 is a side elevation of a part of the body of an open automobile, showing the wind shield with my new glare window.

An inspection of the drawing shows that in accordance with the spirit of the invention my new glare window is mounted in working position between the steering wheel 10 and the wind-shield 11 of an automobile body 12. The arrangement of my new glare window on the wind shield 11 does not disturb the original arrangement of the windshield and the upper window 11$^a$ of the same, hingedly supported at 13 by the frame 14, can be swung outwardly for the purpose of ventilating the car, or closed, as may be desired; likewise the lower window 11$^b$, hingedly connected at 15, may be operated in the same manner.

Shortly below the hinge 13 a fixture 16 in the form of a plate with an upwardly extending hook in the shape of a bayonet 17, is rigidly secured by any well known means, such as screws or rivets, so that the bayonet is in a substantially parallel position to the frame 14 of the windshield 11. At the lowest point 18 of the bayonet 17 a straight rail 19 is hingedly connected and likewise at the uppermost point 20 a rail 21 which for the greater part of its length extends straight towards the frame 22 with the preferably rectangular colored glass plate 23, but bends towards rail 19 when it reaches the frame 22. The plate glass 23 corresponds in size to the whole upper window of the wind shield so as to protect the eye-sight of the driver against any annoyance by the glare of the searchlights of another automobile coming at night time from an opposite direction. It will be noticed from Fig. 1 that the bent branch of rail 21 runs parallel with the frame 22 and the colored window 23 when the latter is in its working position, which is substantially parallel to the windshield, and that in this position the straight part of rail 21 is substantially parallel to the straight rail 19.

Both rails 19 and 21 are hingedly connected with frame 22 at 24 and 25, respectively, hinge point 24 being below the latter. Owing to this hinged connection of rails 19 and 21 to bayonet 17 and to the frame 22 the plate 23 held by the latter is movable from its working position as illustrated by Fig. 1, i. e., from an almost vertical position, substantially parallel to the windshield 11, in an upward direction towards the roof, or top, of the car. When it is not necessary to use the colored plate 23, then I push the plate upwardly, the hinges 24 and 25 moving in an outward direction, as indicated by arrows A, until the plate 23 is in its temporary position 26, substantially parallel to the top, this position being illustrated by dotted lines. When moving into this position the hinge point 24 always moves between the hinge point 25 and the windshield 11 until it finally arrives in the hollow of the knee 21$^a$ of rail 21 so that it is slightly above hinge point 25 which is located approximately in the middle of the side of frame 22, the line of the center of gravity, and carries the weight of the window 23, with the result that hinge point 24 in this position acts as a stop to rail 21, rail 19 bracing rail 21.

As hinge 24 is located on frame 22 below the center of gravity of the window 23, the weight of the same above the point 24 tends to move said point upwardly and also rail 19 to swing outwardly, but they are prevented from doing so by the point 25 abutting and pressing against rail 19 for the weight of the whole window 23 is centered in the point 25.

It is evident from the foregoing that the window in both its vertical, or working, position and the temporary, horizontal position is well balanced and that, in view of its relatively small weight, it is easily pushed from the vertical position into the horizontal position; from the latter position it is even more easily brought into the vertical position as it is only necessary to slightly pull downward on the forward end of the plate until the hinge point 24 is below the hinge point 25 and the window 23 drops then by its own weight into its vertical or working position, between the windshield 11 and the steering wheel, extending in this position from somewhat below the steering wheel to approximately the upper rim of the windshield and covering the whole width of same. The relation of the window to these two latter elements of the car construction is very important as it swings from this position without interfering in any way with the elements necessary for the operation of the car, the upper edge of the window swinging rearwardly and the lower edge forwardly, without requiring any other movement from the driver than just raising his arm to get hold of the window.

Figure 2:
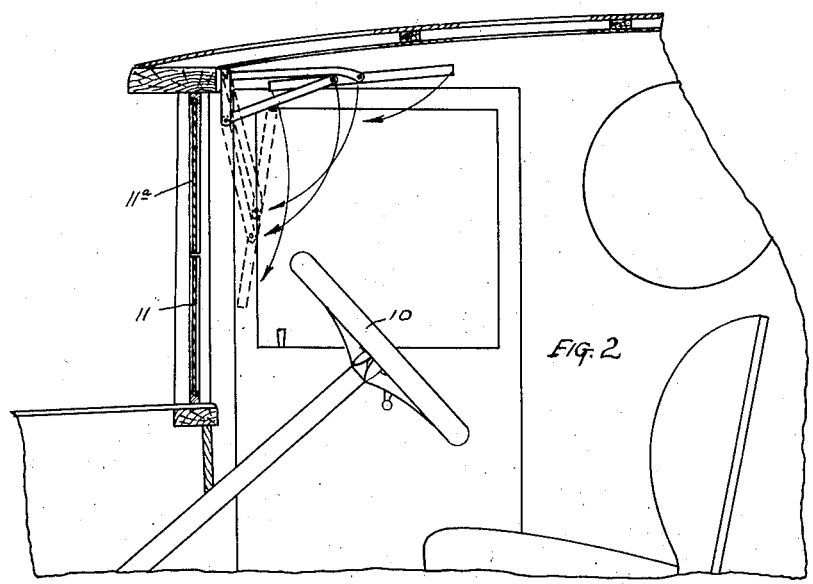
Fig. 2 is a side elevation of a part of the body of a closed car showing the new glare window arranged to the front rail supporting the roof of the car.

The arrangement of my new glare window in a closed car, Fig. 2, is absolutely the same in every respect as that in an open car. The only difference is caused by the absence of a frame to the windshield which would allow to conveniently fix plate 16 to the same and for this reason this plate 16 is secured to the front rail of the roof, or top, the bayonet 17 depending from the plate 16, while the position of the hinge points 18 and 20, and of the other elements, otherwise remains unchanged; I wish to say, however, that in closed cars the windshield is usually erected in a more vertical position than the slightly rearwardly inclined shield in the open cars, but this difference is not so great that for the purpose of this invention the position of the window 23, when in working position, could not be claimed to be "substantially parallel" to the windshield. As furthermore the construction of the bodies of the automobiles, as far as the windshields and the tops are concerned, varies greatly, I do not want to be limited to securing exclusively the plate 16 with the bayonet like arm 17 to either the frame of the windshield or to the front rail of the top, as in case these elements in a car do not lend themselves readily to securing the plate 16 thereto, said plate 16 can be easily modified and secured with the same effect to any other element so that the said fixture will be in a location between the windshield and the steering wheel. In view of the difference pointed out above I mean to include in the term "automobile body" in the claims the windshield and its frame as well as the front rail and any suitable location for the securing of the fixture 16.

Furthermore I wish to state that I embrace in the term "colored" glass plate any such glass plate which for the greater part consists of white glass but which may be prepared so as to absorb the glare of the search lights, or sun light, for instance by having in its body absorbent media, or reflecting bodies such as crystals, scales or the like means which may reflect the beams of light in such manner as to comply with the spirit of this invention.

What I claim is:

1. A movable glare shield for automobiles, comprising a colored glass plate covering the front and extending from below the steering wheel to above the eyesight of the driver, a frame surrounding said colored plate, a fixture extending into a bayonet shaped arm, secured to the automobile body in front of and above the steering wheel, a straight rail hingedly connected to the frame below the center of gravity of the framed glass plate and with its other end to the lowest point of aforesaid bayonet, another rail slightly bent at one end, hingedly connected with its bent end to the frame at the height of the center of gravity of the framed glass plate and with its other end to the uppermost point of the bayonet, both rails being of such length as to hold the colored glass plate in front of the steering wheel in a substantially vertical position extending from slightly below the steering wheel to above the eyesight of the driver.

2. A movable glare shield for automobiles, comprising a rectangular glass plate of substantiallly the same dimensions as the upper window of the windshield, a frame surrounding said colored glass plate, a fixture extending into a bayonet shaped arm, secured to the automobile body near the upper edge of the windshield in front of the steering wheel, a straight rail hingedly connected to the frame below the center of gravity of the glass plate, and with its other end to the lowest point of aforesaid bayonet, another rail slightly bent at one end hingedly connected with its bent end to aforesaid frame at substantially the middle of its side and with the other end to the uppermost point of the bayonet, both rails being of such length as to hold the colored glass plate in front of the steering wheel in a vertical position substantially parallel to the upper window of the windshield.

3. A movable glare shield for automobiles, comprising a rectangular glass plate of substantially the same dimensions as the upper window of the windshield, a frame surrounding said colored glass plate, a fixture extending into a bayonet shaped arm, secured to the automobile body near the upper edge of the windshield, in front of the steering wheel, a straight rail hingedly connected to the frame below the center of gravity of the glass plate and with its other end to the lowest point of aforesaid bayonet, another rail, slightly bent at one end, hingedly connected with its bent end to aforsaid frame at substantially the middle of its side and with the other end to the uppermost point of the bayonet, both rails being of such length as to hold the colored glass plate in front of the steering wheel in a vertical position substantially parallel to the upper window of the windshield, both rails being also in such relation to each other that the hinge point of the straight rail with the frame of the glass plate is slightly above the hinge point of the bent rail with the frame so as to abut said rail below its knee when the glare window is moved upwardly into a horizontal position substantially parallel to the top of the automobile.

4. A movable glare shield for automobiles comprising a rectangular colored glass plate of substantially the same dimensions as the upper window of the windshield, a frame surrounding said colored glass plate, a fixture, extending into a bayonet shaped arm, secured to the automobile body near the upper edge of the windshield in front of the steering wheel, a straight rail hingedly connected to the frame below the center of gravity of the glass plate and with the other end to the lowest point of aforesaid bayonet, another rail, slightly bent at one end, hingedly connected with its bent end to aforesaid frame at substantially the middle of its side and with its other end to the uppermost point of the bayonet, both rails being of such length as to hold the colored glass plate in front of the steering wheel in a vertical position registering with and substantially parallel to the upper window of the windshield and being furthermore of such length in relation to each other that the hinge point of the bent rail with the frame of the glass plate abuts the straight rail when the glass plate is in the position parallel to the windshield.

CARL E. E. WOLFERMANN.